July 6, 1926.

R. R. HOWELL

CONVEYER

Filed June 20, 1924

INVENTOR
ROBERT R. HOWELL
By Paul, Paul & Moore
ATTORNEYS

July 6, 1926.

R. R. HOWELL 1,591,041

CONVEYER

Filed June 20, 1924

INVENTOR
ROBERT R. HOWELL
BY Paul, Paul & Moore
ATTORNEYS

July 6, 1926. 1,591,041
R. R. HOWELL
CONVEYER
Filed June 20, 1924 3 Sheets-Sheet 3

INVENTOR
ROBERT R. HOWELL
By Paul, Paul & Moore
ATTORNEYS

Patented July 6, 1926.

1,591,041

UNITED STATES PATENT OFFICE.

ROBERT R. HOWELL, OF MINNEAPOLIS, MINNESOTA.

CONVEYER.

Application filed June 20, 1924. Serial No. 721,266.

This invention relates to new and useful improvements in conveyers particularly adapted for use in conveying from one place to another, potatoes and other small articles, and more particularly relates to such conveyers having a plurality of branch or cross conveyers removably connected thereto. Gates are provided on the main conveyer at the receiving end of each cross conveyer, and these gates are adapted selectively to be swung to a diagonal position over the main conveyer for the purpose of intercepting the travel of the potatoes thereon and to shunt or direct them on the selected branch conveyer. Each deflecting gate is provided with a novel operating mechanism so constructed that when the gate is swung into operative position over the main conveyer, the driving mechanism for the selected cross conveyer will simultaneously be actuated with the resultant starting of the conveyer belt thereof. Means are also provided for yieldably retaining the gates in either operative or inoperative position.

The object of this invention therefore is to provide an improved conveying apparatus.

A further and more specific object of the invention is to provide a simple and efficient means for operating the cross conveyer gates of such a conveyer, and simultaneously actuating the driving mechanism for the selected cross conveyer belt.
Other objects of the invention will more fully appear from the following description and the accompanying drawings, and will be pointed out in the annexed claims.

In the drawings there has been disclosed a structure designed to carry out the various objects of the invention, but it is to be understood that the invention is not confined to the exact features shown as various changes may be made within the scope of the claims which follow.

Figure 3:
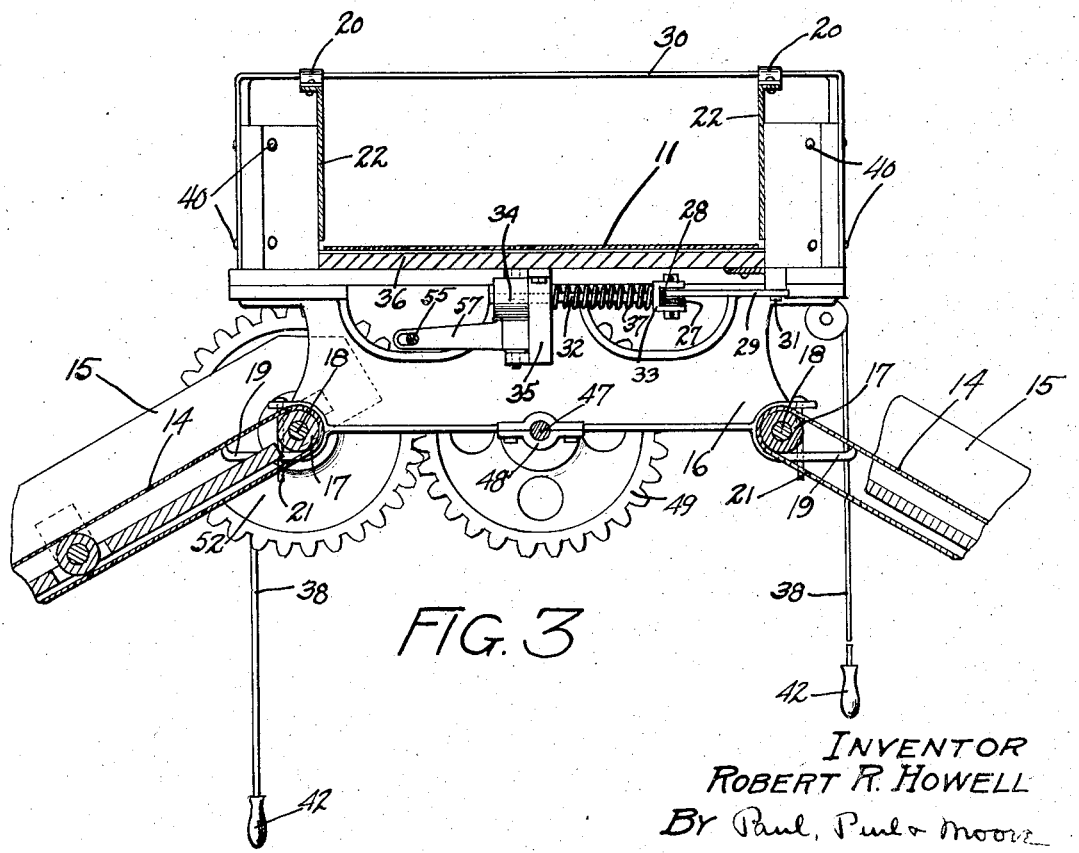
Figure 3 is a transverse sectional view on the line 3—3 of Figure 2, showing the preferred manner of removably connecting the cross conveyers to the main conveyer.
Figure 4:
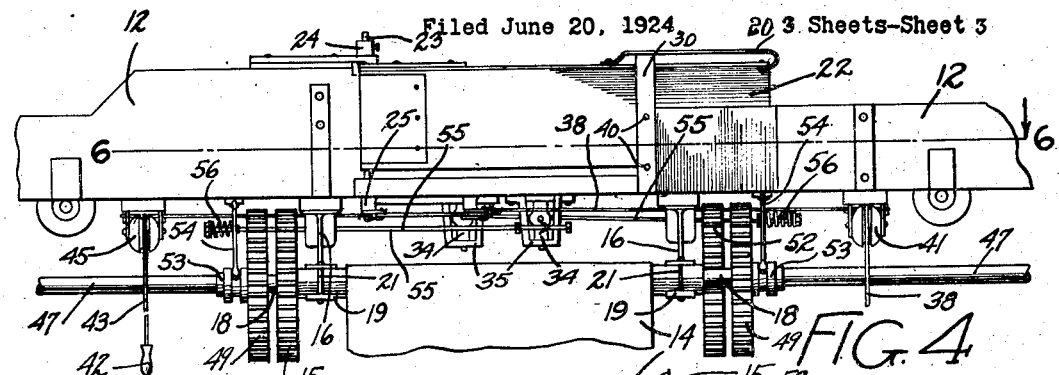
Figure 4 is a side elevation of Figure 3.

In the selected embodiment of the invention here shown there is illustrated a main conveyer comprising a conveyer belt 11 and the opposed side walls 12. This conveyer may be supported by suitable means, not shown. A plurality of cross conveyers, comprising the usual conveyer belts 14 and side walls 15, have their receiving ends pivotally and removably connected to the main conveyer by means of supporting brackets 16, secured to the underside of the main conveyer, as particularly shown in Figure 3. A conveyer belt roll 17 is terminally mounted on each cross conveyer adjacent the main conveyer, and each such roll has a shaft 18 passing therethrough, the ends of which outwardly project through the side walls 15 of the conveyers, adapted to be seated in forks 19 on the supporting brackets 16, thus providing a simple supporting means for the receiving ends of the conveyers. Lock pins or bolts 21 are inserted in apertures provided in the forks 19 to prevent the cross conveyers from accidentally becoming disengaged from the main conveyer while in use.

Figure 5:
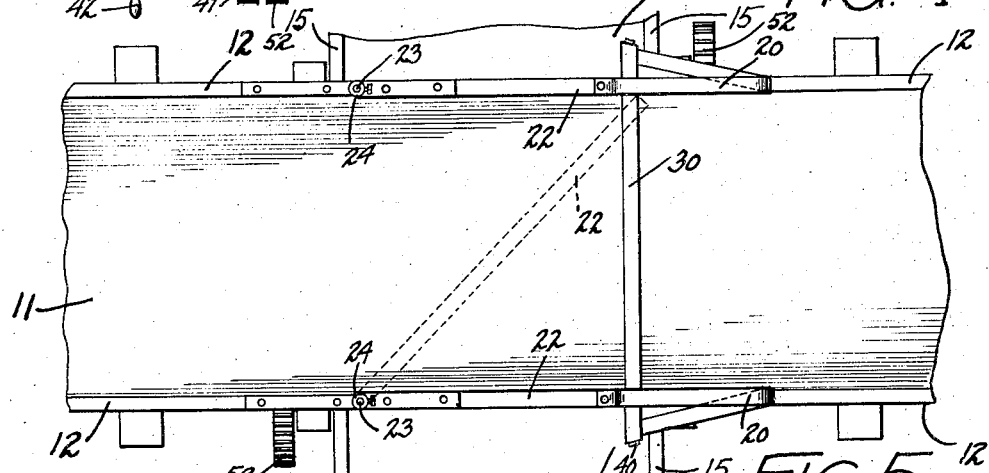
Figure 5 is a plan view of a portion of the main conveyer and two of the cross conveyers, showing in full lines, the gates in closed or inoperative position.

The means provided for intercepting the travel of the potatoes or other articles being conveyed by the main conveyer, and deflecting or directing them therefrom onto one of the cross-conveyers, consists preferably in the provision of a plurality of deflecting gates or intercepters 22 which are pivotally mounted on the main conveyer. These gates are preferably of sheet metal, and when in closed or inoperative position as shown in Figure 5, constitute a portion of the side walls 12 of the main conveyer. Each gate is secured to an upright gate-operating shaft 23 which is mounted in suitable bearings 24 and 25 secured to the main conveyer, and whereby the gates may be swung to an angular operative position over the main conveyer to direct the potatoes or articles therefrom onto the selected cross conveyer. Each gate 22 also preferably has a loop 20 secured to the upper marginal edge thereof adapted to slide on a transverse gate-supporting bar 30 arranged over the main conveyer and having its ends downwardly bent and secured to the side walls of the conveyer by such means as the bolts 40. The above described construction provides a simple means for supporting the outer ends of the gates and prevents them from sagging and coming in contact with the main conveyer belt.

Figure 1:
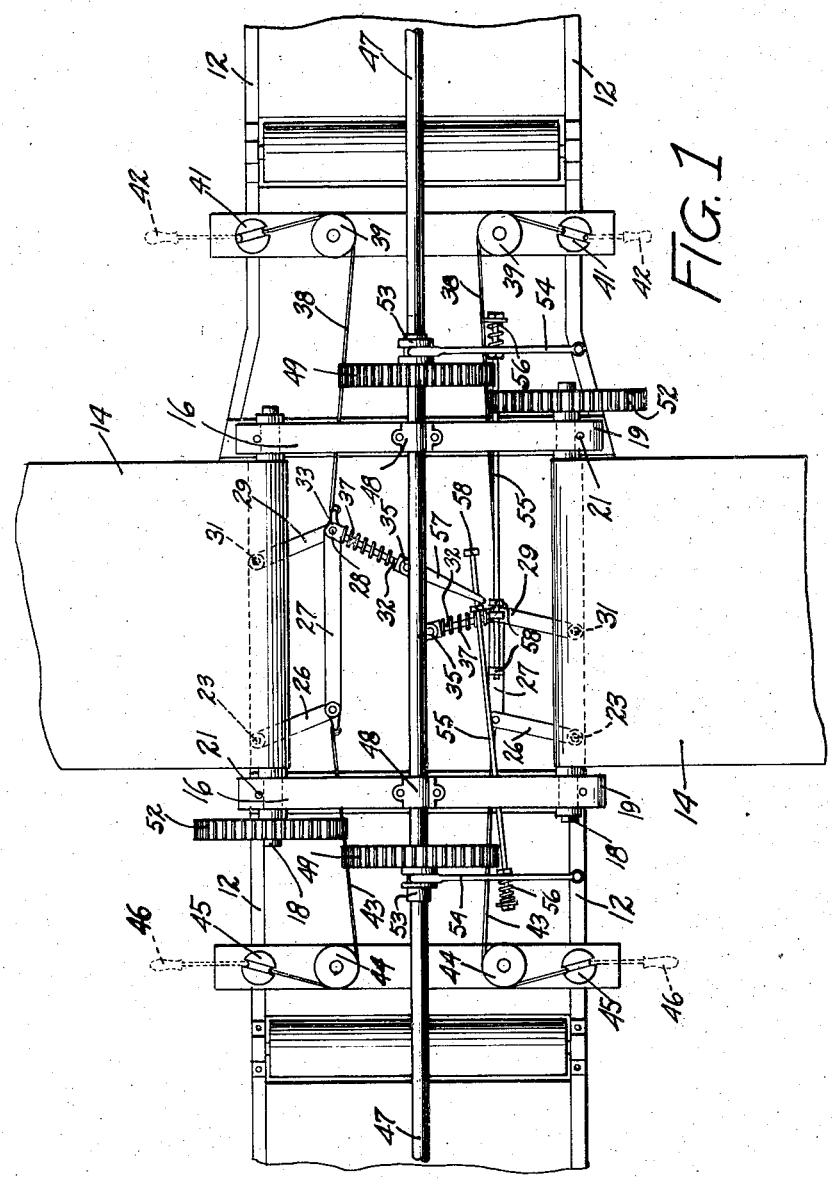
Figure 1 is a bottom view of a portion of the main conveyer and two of the cross conveyers, showing the novel mechanism provided for operating the cross conveyer gates and the driving mechanism therefor.
Figure 2:
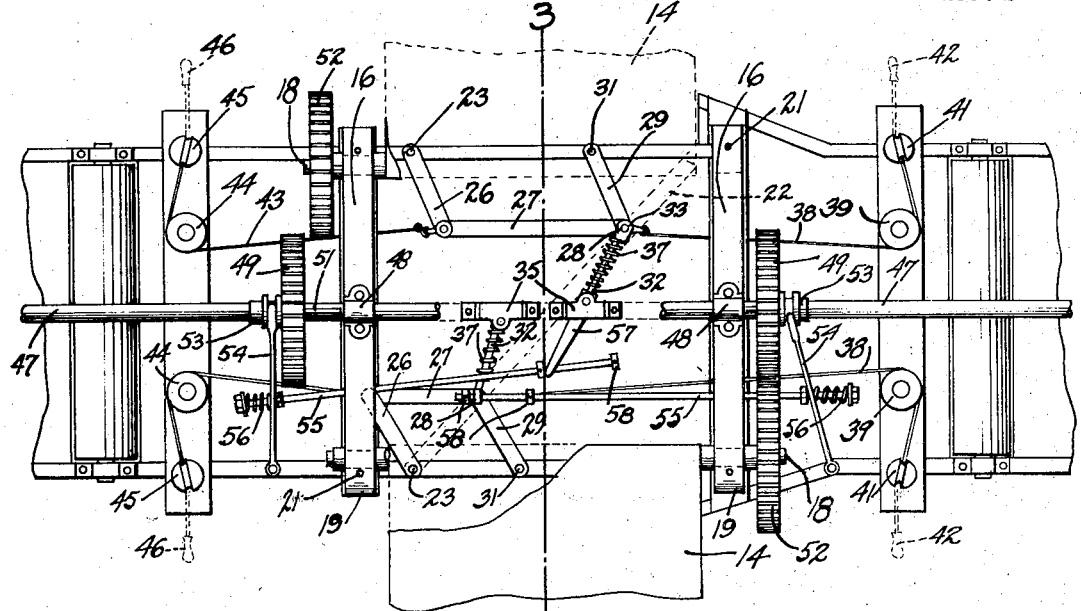
Figure 2 is a similar view showing in dotted lines one of the cross conveyer gates in operative position;

The gate-operating mechanism consists of a toggle mechanism mounted underneath the main conveyer and preferably supported thereby. As the operating mechanism for the various gates are substantially identical in construction, but one such mechanism will be described, like parts being indicated by like numerals. An arm 26 has one end secured to the lower end of the upright shaft 23 and its other end pivotally connected to one end of a connecting link 27. The other end of this link is pivotally connected to a toggle-joint 28 of a toggle-joint mechanism as shown in Figures 1 and 2. This toggle-joint mechanism comprises a toggle arm 29, having one end pivotally mounted on a fixed center or pivot pin 31, secured to the frame of the main conveyer. The other member of the toggle mechanism consists of a rod 32, having a forked end 33 pivotally connected to the toggle joint 28. When the gates are positioned as shown in full lines in Figure 1, the swinging or outer end of the open gate will abut against the adjacent face of its complementary closed gate, thereby aiding to yieldably retain such gate in closed position. Also as a result of the open gate being thus yieldably held against the closed gate, it will be impossible for articles to become wedged between the two gates. The other end of the rod is slidably mounted in a bearing 34 which is pivotally mounted in a bracket 35 secured to the bottom 36 of the main conveyer.

Figure 6:
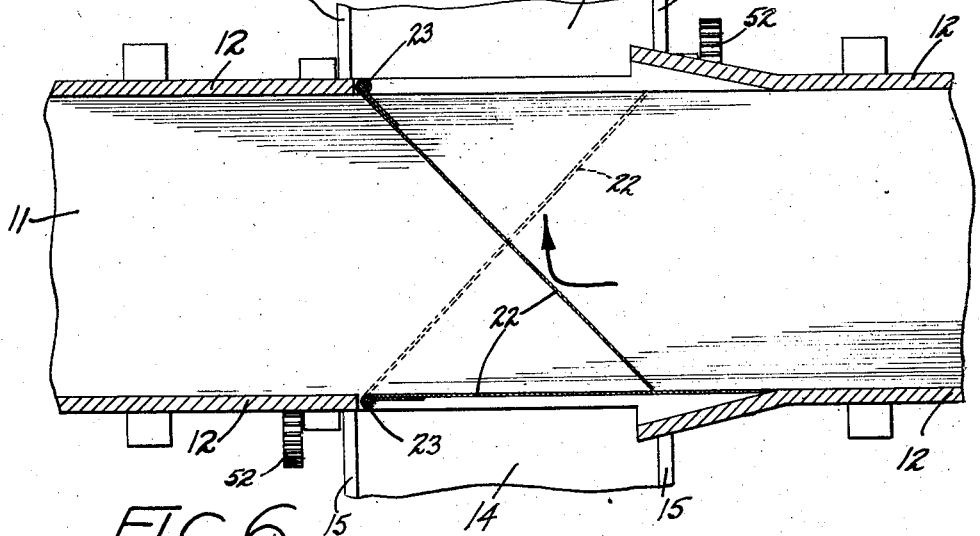
Figure 6 is a sectional plan view on the line 6—6 of Figure 4 showing in full lines one of the gates in open operative position and the other in closed position.

A compression spring 37 is coiled about the forked rod 32 in such a manner as to exert a force against the toggle joint 28 and also against the bearing 34, thereby tending to force the two centers apart. Thus, when the toggle-joint is positioned as shown in the upper portion of Figures 1 and 2, the gate will be yieldably retained in closed inoperative position by the action of the spring 37. When it is desired to direct or shunt the potatoes or other articles from the main conveyer to the cross conveyer, the gate will be swung from the position shown in full lines in Figure 5, to the full line position shown in the upper portion of Figure 6, in which position it will intercept the travel of the potatoes and direct them to the selected cross conveyer as indicated by the arrow. When the gate has thus been opened the toggle-joint 28 will be positioned as shown in the lower portion of Figure 2.

It will be noted on the drawings that when the movable toggle-joint 28 passes from gate-closing to gate-opening position and, vice-versa, it passes through an imaginary center-line drawn through the fixed pivotal center 31 and the vertical axis of the bearing 34, and in so doing, will oscillate from the pivotal center 31. As the toggle joint 28 is moved from either of its adjusted positions towards the center-line of the two fixed pivotal centers, the spring 37 will be compressed, and as soon as the joint passes over the center-line the tension of the spring will cause the joint to be moved to the end of its stroke with the resultant opening or closing of the gate. During such operation the end of the forked rod 32 will slide in the bearing 34. From the above, therefore, it will readily be seen that as the toggle-joint 28 passes from one position to the other, the spring 37 will alternately exert its tension to yieldably hold the toggle and therefore the gate, in either of its adjusted positions to which it has manually been moved.

The means provided for manually operating the toggle mechanism to open and close the gate, preferably consists in the provision of suitable cables or ropes secured to each end of the toggle mechanism and positioned so that they may be conveniently reached by the operator. As shown in Figures 1 and 2 a suitable rope 38 has one end secured to the toggle joint 28 and passes therefrom around an idler pulley or sheave 39 and over a suitable self-locking grooved pulley 41 secured to the underside of the main conveyer. A weighted handle 42 is secured to the depending end of the rope. Similarly, a rope 43 is secured to the other end of the link 27 and this rope passes around a sheave 44, and over a self-locking pulley 45, and has a weighted handle 46 secured to the depending end thereof. The two control ropes 38 and 43 provide a simple and practical means for controlling the operation of the gates and also for simultaneously controlling the cross conveyer driving mechanism.

The means provided for driving the cross conveyer belts 14 preferably consists in the provision of a main driving shaft 47 arranged longitudinally of the main conveyer and mounted in capped bearings 48 provided in the brackets 16. A driving gear 49 is slidably mounted upon the main driving shaft 47 and is prevented from relative rotation on the shaft by means of the usual feather key 51. This driving gear 49 is adapted to be moved into mesh with a complementary gear 52 terminally mounted on the cross conveyer shaft 18, for the purpose of driving the cross conveyer belt. The hub 53 of the main driving gear 49 is preferably annularly grooved to receive the yoked end of a gear-shift lever 54 which is pivotally mounted on the main conveyer frame, as shown. A rod 55 has one end yieldably connected to the gear-shift lever 54 by means of a spring 56. The other end of this rod passes through an arm 57 secured to one of the pivotally mounted bearings 34, as plainly shown in Figures 1 and 2. The arm 57 is slotted or apertured in such a manner as to permit it to slide on the rod 55 when the toggle mechanism is actuated by means of the ropes 38 and 43. The sliding movement of the arm on the rod, however, is limited by means of the spaced collars 58 secured to the rod 55. Thus, when the toggle mechanism is actuated, the arm 57 will simultaneously be actuated, and during the first part of the movement the arm 57 will slide on the rod without imparting any longitudinal movement thereto. As soon, however, as the toggle-joint 28 has passed through the center line of the fixed center 31 and vertical axis of the bearing 34, as hereinbefore stated, the arm will engage the collar adjacent the end of the rod and will thus move the gear-shift lever, which will cause the driving gear 49 to be moved into mesh with the cross-conveyer gear 52, with the resultant starting of the cross conveyer belt. Conversely, when the toggle-joint 28 is moved in the opposite direction the other collar 58 will be engaged by the arm 57 and the clutch actuated to move the gear 49 out of mesh with the driven gear 52.

By thus actuating the gear-shift lever 54 by means of the arm 57, it will readily be seen that when the toggle mechanism is actuated by means of the ropes 38 and 43, to open or close the deflecting gate 22, the cross conveyer driving mechanism will simultaneously be actuated to either start or stop the conveyer belt 14 thereof, depending upon the movement of the toggle joint 28. Also, by means of the spring 37 the combined gate-and-gear mechanism will be yieldably held in adjusted positions. The spring 37 will also prevent the gate from remaining only partially opened as its action in passing over the center, will complete the opening or closing movement thereof.

Having thus described my invention what I claim as new and desire to secure by Letters-Patent, is:

1. The combination with a main conveyer, of a plurality of cross conveyers, deflecting gates therefor, a toggle gate operating mechanism beneath the main conveyer, a driving means for the cross conveyers, said driving means operatively connected to the gate operating mechanism and adapted for simultaneous operation therewith, with means for supporting the outer ends of the gates.

2. The combination of a main conveyer, of a plurality of branch members associated therewith, a plurality of gates adapted selectively to be opened to direct articles from the main conveyer to one of the branch members, means to operate said gates, and said gates being arranged in pairs of oppositely disposed gates whereby when one gate is opened, a portion thereof will abut against its opposite gate and thereby aid in retaining the opposite gate in closed position.

3. The combination with a main conveyer, of a plurality of branch conveyers associated therewith, a plurality of gates adapted selectively to be opened to direct articles from the main conveyer to one of the branch conveyers, said gates being oppositely arranged in pairs and adapted for simultaneous operation whereby when one gate of a pair is closed, the other gate of the same pair will be opened and a portion thereof will abut against the opposite closed gate and aid in retaining it in closed position, means for operating said gates, and a gate-supporting member mounted over the main conveyer and adapted to support the swinging ends of the gates when opened and closed.

4. The combination with a main conveyer, of a plurality of cross conveyers, deflecting gates therefor, a gate operating mechanism beneath the main conveyer, a driving means for the cross conveyers, and a supporting member arranged over said main conveyer and adapted to support the swinging ends of said gates independent of their hinged connections with the main conveyer when the gates are opened and closed.

5. The combination with a main conveyer, of a plurality of cross conveyers, deflecting gates therefor, a gate operating mechanism beneath the main conveyer, a driving means for the cross conveyers, a gate-supporting member arranged over said main conveyer, and each gate having a sliding connection with said member.

In witness whereof, I have hereunto set my hand this 26th day of May 1924.

ROBERT R. HOWELL.